United States Patent
Sinn et al.

(10) Patent No.: US 12,242,613 B2
(45) Date of Patent: Mar. 4, 2025

(54) AUTOMATED EVALUATION OF MACHINE LEARNING MODELS

(71) Applicant: INTERNATIONAL BUSINESS MACHINES CORPORATION, Armonk, NY (US)

(72) Inventors: Mathieu Sinn, Mulhuddart (IE); Beat Buesser, Mulhuddart (IE); Ngoc Minh Tran, Dublin (IE); Killian Levacher, Dublin (IE); Hessel Tuinhof, Dublin (IE)

(*) Notice: Subject to any disclaimer, the term of this patent is extended or adjusted under 35 U.S.C. 154(b) by 380 days.

(21) Appl. No.: 16/948,762

(22) Filed: Sep. 30, 2020

(65) Prior Publication Data

US 2022/0100867 A1 Mar. 31, 2022

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01); *G06F 2221/034* (2013.01)

(58) Field of Classification Search
CPC .. G06F 21/577; G06F 2221/034; G06F 18/29; G06F 21/55; G06N 20/00; G06N 3/04
See application file for complete search history.

(56) References Cited

U.S. PATENT DOCUMENTS

| | | | |
|---|---|---|---|
| 10,657,259 B2 | 5/2020 | Lee et al. | |
| 10,896,664 B1 * | 1/2021 | Buesser | G10L 25/30 |
| 11,036,857 B2 * | 6/2021 | Tran | G06N 3/045 |
| 11,200,456 B2 * | 12/2021 | Pinkovich | G06F 7/58 |
| 11,288,408 B2 * | 3/2022 | Buesser | G06F 21/84 |
| 11,334,671 B2 * | 5/2022 | Buesser | G06N 3/045 |
| 11,494,496 B2 * | 11/2022 | Grosse | G06F 21/577 |
| 11,636,284 B2 * | 4/2023 | Ghosh | G06V 10/7788 |
| | | | 706/45 |

(Continued)

FOREIGN PATENT DOCUMENTS

| | | |
|---|---|---|
| CN | 108681250 A | 10/2018 |
| EP | 3611854 A1 | 2/2020 |
| WO | 2020028036 A1 | 2/2020 |

OTHER PUBLICATIONS

Title: Adversarial Robustness Toolbox v1.0.0 Author(s): Maria-Irina Nicolae, Mathieu Sinn, Minh Ngoc Tran, Beat Buesser, Ambrish Rawat, Martin Wistuba, Year: 2019 Publisher: arxiv.org.*

(Continued)

*Primary Examiner* — Shahriar Zarrineh
*Assistant Examiner* — Gita Faramarzi
(74) *Attorney, Agent, or Firm* — Elliot J. Shine

(57) ABSTRACT

Various embodiments are provided for automated evaluation of machine learning models in a computing environment by one or more processors in a computing system. A level of robustness of a machine learning model against adversarial whitebox operations may be evaluated and determined by applying a data set used for testing the machine learning model, one or more adversarial operation objectives, an adversarial threat model, and a selected number of hyperparameters. Results from the adversarial operation may be analyzed and a modified machine learning model may be generated while performing the evaluating and determining.

25 Claims, 10 Drawing Sheets

(56) References Cited

U.S. PATENT DOCUMENTS

| | | | |
|---|---|---|---|
| 11,783,230 B2* | 10/2023 | Brower | G06N 3/04 |
| | | | 382/157 |
| 11,836,256 B2* | 12/2023 | Chen | G06N 3/04 |
| 2018/0046915 A1* | 2/2018 | Sun | G06N 3/082 |
| 2019/0080089 A1 | 3/2019 | Chen | |
| 2019/0188562 A1 | 6/2019 | Edwards et al. | |
| 2020/0143045 A1* | 5/2020 | Joye | G06F 21/75 |
| 2020/0151505 A1 | 5/2020 | Saito et al. | |
| 2020/0159924 A1* | 5/2020 | Tran | G06F 21/566 |
| 2020/0167471 A1 | 5/2020 | Rouhani et al. | |
| 2020/0201993 A1 | 6/2020 | Gonnet et al. | |
| 2020/0286095 A1* | 9/2020 | Anunciacao | G06F 18/245 |
| 2020/0380300 A1* | 12/2020 | Zhang | G06F 18/2411 |
| 2020/0387836 A1* | 12/2020 | Nasr-Azadani | G06N 20/20 |
| 2020/0410228 A1* | 12/2020 | Wang | G06N 3/04 |
| 2021/0048806 A1* | 2/2021 | Fainekos | G06N 3/08 |

OTHER PUBLICATIONS

CWE Content Team, CWE-1039 "Automated Recognition Mechanism with Inadequate Detection or Handling of Adversarial Input Perturbations"; Mar. 12, 2018. https://cwe.mitre.org/data/definitions/1039.html.

R. Shankar et al., "Adversarial Machine Learning—Industry perspectives", arXiv:2002.05646, 2020. May 2020. (7 pages).

Security in Development—The IBM Secure Engineering Framework. 2018 (28 pages) https://www.redbooks.ibm.com/redpapers/pdfs/redp4641.pdf.

"White Paper on Artificial Intelligence A European Approach to Excellence and Trust" Feb. 19, 2020; https://ec.europa.eu/info/sites/info/files/commission-white-paper-artificial-intelligence-feb2020_en.pdf (26 pages).

W. He et al., "Adversarial example defenses: Ensembles of weak defenses are not strong", arXiv:1706.04701, 2017. (11 pages).

N. Carlini, D. Wagner, "Adversarial examples are not easily detected: Bypassing ten detection methods", AISec Workshop, 2017. (14 pages).

A. Athalye et al., "Obfuscated gradients give a false sense of security: circumventing defenses to adversarial examples", ICML, 2018. arXiv:1802.00420v4 2018. (12 pages).

N. Carlini et al., "On evaluating adversarial robustness", arXiv:1902.06705, 2019. (24 pages).

F. Tramer et al., "On adaptive attacks to adversarial example defences", arXiv:2002.08347, 2020. (43 pages).

N. Papernot et al., "Technical Report on the CleverHans v2.1.0 Adversarial Examples Library", 2018.

Nicolae et al., "Adversarial Robustness Toolbox v1.2.0", https://github.com/ibm/adversarial-robustness-toolbox, 2018.

J. Rauber et al., "Foolbox Native: Fast adversarial attacks to benchmark the robustness of machine learning models in PyTorch, TensorFlow, and JAX", https://github.com/bethgelab/foolbox, 2020.

B. Biggio et al., "Evasion attacks against machine learning at test time", ECML-PKDD, 2013. (16 pages).

C. Szegedy et al., "Intriguing properties of neural networks", arXiv:1312.6199, 2013. (10 pages).

M. Nicolae et al., "Adversarial Robustness Toolbox v1.0.0 ", arXiv:1807.01069, 2018. (34 pages).

A. Madry et al., "Towards deep learning models resistant to adversarial attacks", ICLR, 2018. (28 pages).

J. Cohen et al., "Certified Adversarial Robustness via Randomized Smoothing", arXiv:1902.02918, 2019. (36 pages).

P. Chen et al., "EAD: Elastic-net attacks to deep neural networks via adversarial examples", AAAI, 2018. (19 pages).

N. Carlini, D. Wagner, "Towards evaluating the robustness of neural networks", IEEE S&P 2017. (19 pages).

P. Chen et al., "ZOO: Zeroth Order Optimization based black-box attacks to deep neural network without training substitute models", AISec workshop, 2017. (12 pages).

J. Chen et al., "HopSkipJumpAttack: a query-efficient decision-based attack", arXiv:1904.02144, 2019.

N Papernot et al., "Practical black-box attacks against machine learning", Asia CCS, 2017. (14 pages).

F. Tramer et al., "Ensemble adversarial training: Attacks and defenses", ICLR, 2018. (22 pages).

I. Goodfellow, "New CleverHans feature: Better adversarial robustness evaluations with attack bundling", arXiv:1811.03685, 2018. (6 pages).

M. Sharif et al., "Accessorize to a crime: Real and stealthy attacks on state-of-the-art face recognition", CCS, 2016. (13 pages).

A. Athalye et al., "Synthesizing robust adversarial examples", arXiv:1707.07397, 2017 (20 pages).

Y. Bengio et al., "Estimating or propagating gradients through stochastic neurons for conditional computation", arXiv:1308.3432, 2013. (12 pages).

\* cited by examiner

AUTOMATED EVALUATION OF MACHINE LEARNING MODELS

STATEMENT REGARDING FEDERALLY SPONSORED RESEARCH OR DEVELOPMENT

This invention was made with Government support under Contract No.: HR0011-20-C-0013 awarded by Defense Advanced Research Projects Agency (DARPA). The Government has certain rights in this invention.

BACKGROUND

The present invention relates in general to computing systems, and more particularly to, various embodiments for automated evaluation of robustness of machine learning models under adaptive whitebox adversarial operation in a computing system using a computing processor.

SUMMARY

According to an embodiment of the present invention, a method for automated evaluation of robustness of machine learning models under adaptive whitebox adversarial operation in a computing system is provided. A level of robustness of a machine learning model against adversarial whitebox operations may be evaluated and determined. Results from the adversarial operation may be analyzed and a modified machine learning model may be generated according to the evaluating and determining.

In an additional embodiment, a machine learning model, a data set used for testing the machine learning model, one or more adversarial operation objectives, an adversarial threat model, and a selected number of hyperparameters may be received. A level of robustness of a machine learning model against adversarial whitebox operations may be evaluated and determined by applying a data set used for testing the machine learning model, one or more adversarial operation objectives, an adversarial threat model, and a selected number of hyperparameters. A modified machine learning model may be generated during the evaluating and determining.

In another embodiment, a level of robustness of a machine learning model against adversarial whitebox operations may be evaluated and determined by applying a data set used for testing the machine learning model, one or more adversarial operation objectives, an adversarial threat model, and a selected number of hyperparameters. An evaluation summary may be generated based on evaluating and determining of the level of robustness of the machine learning model.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
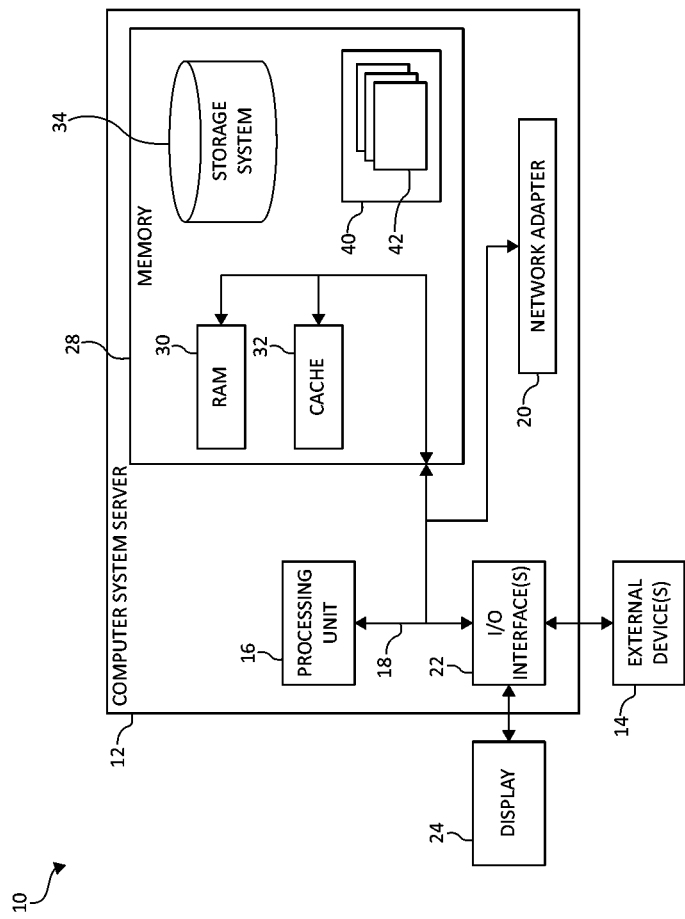
FIG. 1 is a block diagram depicting an exemplary cloud computing node according to an embodiment of the present invention.

The present invention relates generally to the field of artificial intelligence ("AI") such as, for example, machine learning and/or deep learning. Machine learning allows for an automated processing system (a "machine"), such as a computer system or specialized processing circuit, to develop generalizations about particular datasets and use the generalizations to solve associated problems by, for example, classifying new data. Once a machine learns generalizations from (or is trained using) known properties from the input or training data, it can apply the generalizations to future data to predict unknown properties.

Moreover, machine learning is a form of AI that enables a system to learn from data rather than through explicit programming. A major focus of machine learning research is to automatically learn to recognize complex patterns and make intelligent decisions based on data, and more efficiently train machine learning models and pipelines. However, machine learning is not a simple process. As the algorithms ingest training data, it is then possible to produce more precise models based on that data. A machine-learning model is the output generated when a machine-learning algorithm is trained with data. After training, input is provided to the machine learning model which then generates an output. For example, a predictive algorithm may create a predictive model. Then, the predictive model is provided with data and a prediction is then generated (e.g., "output") based on the data that trained the model.

Machine learning enables machine learning models to train on datasets before being deployed. Some machine-learning models are online and continuous. This iterative process of online models leads to an improvement in the types of associations made between data elements. Different conventional techniques exist to create machine-learning (ML) models and neural network (NN) models. The basic prerequisites across existing approaches include having a dataset, as well as basic knowledge of ML model synthesis, NN architecture synthesis and coding skills.

Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Overall, deep learning has led to major advances in optimizing decision making and extracting business value from unstructured data such as, for example, images, audio, videos and texts. However, while deep learning achieves increased computing performance on a wide variety of data types and tasks, some challenges, weakness, and/or security issues of Deep Neural Networks (DNNs) exists. For example, DNNs are susceptible to adversarial operations where an adversary can completely alter the behavior of the DNN by making imperceptible changes to its inputs. Moreover, adversaries/adversarial systems (e.g., which may implement an adversarial operation) may also be mounted in the physical world posing a real threat to the deployment of AI and Deep Learning specifically in security-critical applications such as, for example, biometrics, cybersecurity, autonomous vehicles, robotics, etc. Therefore, protecting and securing machine learning/deep learning against adversarial whitebox operations are essential to ensure the safe deployment of AI and DL in real-world security-critical applications and, more broadly, sustain trust in AI systems.

Adversarial machine learning is studying the brittleness of machine learning models with respect to small changes in the inputs of the machine learning model and how this can be programmatically exploited by adversaries under different threat models. For example, consider the following scenario. Assume an adversary is targeting a classifier $C(\cdot)$, which maps real-valued inputs $x \in \mathbb{R}^m$ onto outputs $y_{pred} \in \{1, 2, \ldots, K\}$ predicting the class label of x. Specifically, if y is the ground-truth label of x, the adversary aims at crafting an adversarial input $x_{adv}$ such that $C(x_{adv}) \neq y$, i.e., $x_{adv}$ is misclassified, while keeping the distance between x and $x_{adv}$ small. Formally, the distance is often measured through the $l_p$ norm $\|x - x_{adv}\|_p$, and a common threat model is to require that the distance is bounded by a prescribed constant, i.e., $\|x - x_{adv}\|_p \leq \varepsilon$ for some $\varepsilon > 0$. A variety of algorithms exists for crafting adversarial input $x_{adv}$, encompassing adversarial whitebox operations that assume the adversary has complete knowledge of the classifier as well as blackbox adversarial operations where the adversary has only limited information or access to the targeted classifier.

Beyond this sample scenario, adversarial operations have also been demonstrated on machine learning tasks other than classification (e.g. object detection, sequence-to-sequence predictions, regression) and for other types of adversarial operation objectives (e.g. targeted adversarial operations, physical-world adversarial operations etc.).

On the defense side of adversarial operations, current approaches broadly fall under the following categories. 1) "Preprocessing defenses" that aim at filtering out the adversarial signal from the adversarial input $x_{adv}$ before passing the input to the classifier; however, under an adaptive whitebox adversarial operation, this approach has turned out be widely ineffective. 2) "Ensembling defenses" that aim at defeating the adversaries by applying an ensemble instead of a single classifiers; again, however, this approach has turned out to be ineffective under adaptive whitebox adversarial operations. 3) "Stochastic defenses" that introduce randomness at test-time in order to prevent adversaries from successfully crafting adversarial inputs; again, this approach is also ineffective under adaptive whitebox adversarial operations. 4) "Detection methods" that aim to classify inputs as either adversarial or benign; again, this approach has also ben unable to withstand adaptive whitebox adversarial operations. 5) "Model hardening" approaches that aim at creating robust classifiers, e.g. through adversarial training or randomized smoothing, which so far have been among the few approaches able to withstand adaptive whitebox adversarial operations.

Moreover, adaptive whitebox adversarial operations against machine learning models are a widely considered a threat model and they follow Kerckhoffs's principle, namely, it may be assumed that the adversary has complete knowledge of the system under adversarial operation, except for secret keys. Many proposed defenses against adversarial operations, as mentioned above, fail to prevent or address the adversarial operation (e.g., the defenses are proven to fail or are proven to be broken according to Kerckhoffs's principle). Adaptive whitebox adversarial operations are the most powerful penetration tests and thus should be part of comprehensive security evaluations of machine learning systems and applications. Also, the adaptive whitebox adversarial operations may set baselines for threat assessments under weaker adversaries and/or with additional defense mechanisms in place.

Thus, for deployment in mission-critical applications, evaluating the robustness of machine learning models against adversarial operations has become paramount. Increasingly, adversarial operations are treated as common software security vulnerabilities. As such, evaluating the robustness of machine learning models is becoming an integral part of established software security assessments. Also, increasing the auditing of the robustness of machine learning systems and applications is mandated by regulatory and/or ethical guidelines such as, for example, those set out by various governmental entities or sovereignties.

Accordingly, a need exist for providing an automatic evaluation and diagnosis of machine learning models' adversarial robustness against adaptive whitebox adversarial operations. As such, various embodiments of the present invention provide for automated evaluation and diagnosis of robustness of machine learning models under adaptive whitebox adversarial operation. In one aspect, selected data may be received for training machine learning pipelines. A machine learning model, a data set used for testing the machine learning model, adversarial operation objectives, an adversarial threat model, and a selected number of hyperparameters may be identified, received, and or analyzed. A level of robustness of a machine learning model against adversarial whitebox operations may be evaluated and determined by applying the data set used for testing the machine learning model while also applying the adversarial operation objectives, the adversarial threat model, and the selected number of hyperparameters. A modified machine learning model may be generated and produced while evaluating and determining the robustness of the machine learning model(s) under the adaptive whitebox adversarial operation. That is, the modified machine learning model may be generated in the process of the evaluating and determining. Also, the modified machine learning model may be modified to avoid any issues (such as gradient masking), which would lead to overestimating robustness when performing adversarial operations.

In an additional embodiment, the present invention provides for automatically generating, creating, and/or devising adaptive whitebox adversarial operations for evaluation and diagnosis of the comprehensive robustness evaluations of machine models. That is, mechanisms of the illustrated embodiments provide for automatizing an evaluation and corresponding diagnosis of machine learning model robustness under adaptive whitebox adversarial operations by using machine learning (e.g., artificial intelligence "AI") reasoning and search techniques to guide and automate the evaluation, diagnosis, and synthesis of adaptive whitebox adversarial operations. One or more guidelines may be formalized for devising such adaptive whitebox adversarial operations and offer a framework for performing all the required meta-optimizations. A broad set of adaptive adversarial operations may be used with the automated diagnosis and evaluation of the robustness of a machine learning model automatically be discovered while being enabled to automatically adapt to various types of defenses.

It should be noted that as used herein, the evaluation and diagnosis of the adversarial robustness of machine models includes, at least, applying one or more adaptive whitebox threat models and one or more defenses.

In other embodiments, mechanisms of the illustrated embodiments provide an automated evaluation of machine learning models system (e.g., an automated evaluation of robustness of machine learning models under adaptive whitebox adversarial operation). The automated evaluation of machine learning models system may receive as inputs: 1) a machine learning model, 2) training and test data, 3) adversarial operation objectives, 4) a threat model, and 5) hyperparameters. The automated evaluation of machine learning models system may provide, as outputs, a modified version of the machine learning model, an adversarial operation loss function, an optimizer for optimizing the loss function, adversarial examples and an evaluation summary.

In an additional aspect, the automated evaluation of robustness of machine learning models under adaptive whitebox adversarial operation system may include various component for (a) unmasking gradients of the machine learning model; (b) composing a loss function; (c) configuring an optimizer; (d) performing the adversarial operations on the input data; and (e) reasoning over diagnostic and/or intermediate adversarial operation results during the evaluation.

The automated evaluation of robustness of machine learning models under adaptive whitebox adversarial operation system may include various interfaces for 1) configuring or extending the system components in order to account for new/novel types of adaptive whitebox adversarial operations, 2) providing various interactions between one or more users (e.g., administrators or other machine learning systems) in order to dynamically change the configuration of an ongoing evaluation based on intermediate evaluation summaries, and/or 3) enabling one or more user or other machine learning systems to automatically commence/start an evaluation with partial inputs from a previously started evaluation.

By devising adaptive whitebox adversarial operations for evaluation and diagnosis of the adversarial robustness of machine models using an automated evaluation of robustness of machine learning models under adaptive whitebox adversarial operation system, the security of mission-critical machine learning based systems and applications may be automatically evaluated. Thus, the present invention provides for automatically assessing the security of machine learning systems and applications at scale, e.g. as it would be required as part of standard software security assessment.

It should be noted that an adaptive whitebox threat model, as described herein, may be characterized as follows. The adversary has "full knowledge of the underlying system" including any defenses that may have been put in place, and in the case of a neural network classifier, this includes full knowledge of the network architecture and weights. The adversary may also have full knowledge of a distribution of test-time randomness, but no advance access to the realizations of random variables. In the adaptive whitebox threat model, it is also commonly assumed the adversary has full access to the training data and access to test ground truth labels.

A defender may hold a "small amount" of information secret, however the secret information must be easily replaceable and non-extractable (such as a key). "Adaptive," as used herein, may refer to a general notion in security of an adversary (or an adversarial operation, respectively) that adapts to any measures that the defender may have undertaken. Thus, a typical starting point when devising an adaptive whitebox adversarial operation is to ask, after the defense has been defined: "what adversarial operation could possibly defeat this defense?"

Defenses may be evaluated under the threat model under which the defenses claim to be secure (e.g., bounded infinity "∞" distortion of $l_\infty=8/255$). In one aspect, a diagnostic check may be performed to decide whether an adaptive whitebox adversarial operation should be devised. For example, the diagnostic check perform the following.

First, the diagnostic check may run a gradient-based adversarial operation (e.g., elastic-net adversarial operations to deep neural networks ("EAD") to generate $l_{-1}$ norm constrained perturbations for $l_2$ (e.g., robustness evaluation of a neural network and/or deep learning model's resistance to adversarial operations for $l_\infty$) and compare the performance against a combination of gradient-free adversarial operations (e.g., black-box adversarial operations, transfer adversarial operations using a similar substitute model to generate high-confidence adversarial examples, and/or brute-force random adversarial operations (on a subset of the test data), either directly sampling within a set of inputs around the original test input data with $l_p$ distance less than or equal to a given budget) defined by the threat model, or starting by sampling random points at a large distance from the original input and then, each time an adversarial example is found, limit the search to strictly smaller perturbations.

If the gradient-free adversarial operations achieve significantly higher success rates than the gradient-based ones, this indicates that an adaptive adversarial operation needs to be devised.

Another diagnostic check is to plot, for a gradient-based adversarial operation, the number of gradient steps or the perturbation budget against the adversarial operation success rate or model loss. With sufficiently high perturbations, the model predictions should not be more accurate than random guessing, otherwise an adaptive adversarial operation is required. Finally, a determination should be made relating to gradient masking, e.g. whether the gradients used in the adversarial operations are zero, infinite or not a number (NaN).

Adaptive adversarial operations typically tackle one or several of the following four issues: 1) gradient masking, 2) inconsistent or difficult-to-optimize loss functions, 3) ineffective optimizers or optimization hyperparameter settings, and/or 4) ineffective adversarial operation objectives or adversarial operation hyper-parameter settings.

For gradient masking, some defense are based on masking gradients, either unintentionally (e.g. for adversarial training against weak adversaries), or intentionally (a strategy coined "gradient obfuscation"). Since gradient masking can be circumvented using black-box, a transfer or brute-force random search adversarial operations, gradient masking is considered an incomplete defense to adversarial operation threats.

For inconsistent or difficult-to-optimize loss functions, "inconsistency" means that higher loss values may not result in strictly stronger adversarial operations and thus, even at the loss' maximum, an adversarial operation may fail. Difficult-to-optimize loss functions may introduce gradient masking themselves, may be computationally prohibitively intensive, and/or overly sensitive to hyperparameters.

Ineffective optimizers or optimization hyper-parameter settings involves ensuring that the adversarial operations have converged (e.g. ensure increasing the number of optimization steps does not increase adversarial operation success rate and that learning rates are properly chosen). To optimize loss functions that are difficult to differentiate, entirely resorting to zeroth order optimization or decision-based adversarial operations may be required.

Ineffective adversarial operation objectives or adversarial operation hyper-parameter settings involves e.g., using both targeted and untargeted adversarial operations (specifically, using multi-targeted adversarial operations instead of untargeted ones), or performing feature adversary adversarial operations. The number of adversarial operation random restarts is an important hyperparameter for increasing the strength of adaptive adversarial operations. When performing multiple adversarial operations, the per-example adversarial operation success rate may be reported (e.g., so-called "adversarial operation bundling").

Additionally, as used herein, three types of gradient masking can be distinguished: 1) shattered gradients, 2) stochastic gradients, and 3) vanishing/exploding gradients.

Shattered gradients may be nonexistent, non-numerical or vanishing gradients caused, for example, through non-differentiable model operations and/or numerical instabilities. A backward-pass differentiable approximation (BPDA) may be used to overcome shattered gradients Stochastic gradients may result from randomness at test-time, for instance if the machine learning model itself has stochastic elements (e.g. drop-out), or if the input is randomly transformed (e.g. cropped, rotated, perturbed with noise) before being fed to the machine learning model. Expectation over transformations ("EOT") accounts for the randomness and replaces estimates of the gradient based on single samples by sample averages of gradients over the source or sources of randomness.

Vanishing/exploding gradients may be deep computations resulting in an unusable gradient and often caused by defenses that include multiple iterations of neural network evaluation feeding the output of one computation as the input of the next. Reparameterization may be used to overcome vanishing/exploding gradients.

Backward-pass differentiable approximation (BPDA) may be used to adversarial operation defenses where gradients are not readily available, but may also be used on an arbitrary network, even if it is already differentiable, to obtain a more useful gradient. In one scenario, for example, assume the classifier $C(\bullet)$ is a neural network $C(x)=f_n \circ f_{n-1} \circ \ldots \circ f_1(x)$, where $f_i(x)$ may be a non-differentiable layer with a differentiable approximation $g(x) \approx f_i(x)$ may be found/identified then gradients through $C(x)$ may be approximated by computing a forward pass through the classifier $C(\bullet)$, and in particular through $f_i(\bullet)$, but on the backward pass, replace $f_i(\bullet)$ through $g(\bullet)$. In the case of straight-through estimators, $g(x)$ is chosen as the identity function, which may be applied such as, for example, when the defense applies pre-processing (e.g. a low-pass filter) which aims at rendering adversarial examples ineffective while mostly preserving a given input.

Applying BPDA often may require more iterations of gradient descent than without because each individual gradient descent step is not exactly correct. For expectation over transformation, consider a stochastic classifier $C_\omega(\bullet)$ with $\omega \in \omega$, which may be variables that parameterizes the randomness, where $(\omega, F, P)$ is a probability space with $\Omega$ being the set of all possible outcomes, F the event space, P a probability measure, and $\omega$ a realized outcome (e.g., random sample). The source of randomness may be, e.g., drop-out activations or randomized input transformations in the initial layers. Also, assume that, as a consequence of the randomness, $Var(\nabla_x f_\omega(x)) > 0$, and then estimate $\nabla_x E[f_\omega(x)] = E[\nabla_x f_\omega(x)]$ and estimate $E[\nabla_x f_\omega(x)]$ by taking the average of $\nabla_x f_{\omega i}(x)$ over random samples $\omega_1, \omega_2, \ldots, \omega_n$.

For reparameterization, assume a classifier $C(g(x))$ is provided where $g(\bullet)$ performs some optimization loop to transform the input x (e.g. projecting x onto the manifold spanned by a Generative Adversarial Net). Often times, this optimization loop means that differentiating through $g(\bullet)$, while possible, yields exploding or vanishing gradients. This can be overcome by introducing a change-of-variable $x=h(z)$ for some differentiable function $h(\bullet)$ such that $(h(z))=h(z)$, and computing gradients solely through $C(\bullet)$ for the input $h(z)$.

Also, to improve adversarial operation performance, 1) multi-targeted adversarial operations, 2) feature adversaries, and 3) adversarial operation bundling may be used. Multi-targeted adversarial operations is where instead of directly performing an untargeted adversarial operation, a targeted adversarial operation may be attempted for each of the K−1 possible target classes $t \neq y$, and any successful adversarial example be retained.

For adversarial operation bundling, when performing a variety of adversarial operations (e.g. gradient-based, free, and/or brute-force random), successful adversarial examples may be retained on a per-sample basis. When performing iterative adversarial operations, the adversarial operation loop may be broken as soon as an adversarial example is found.

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
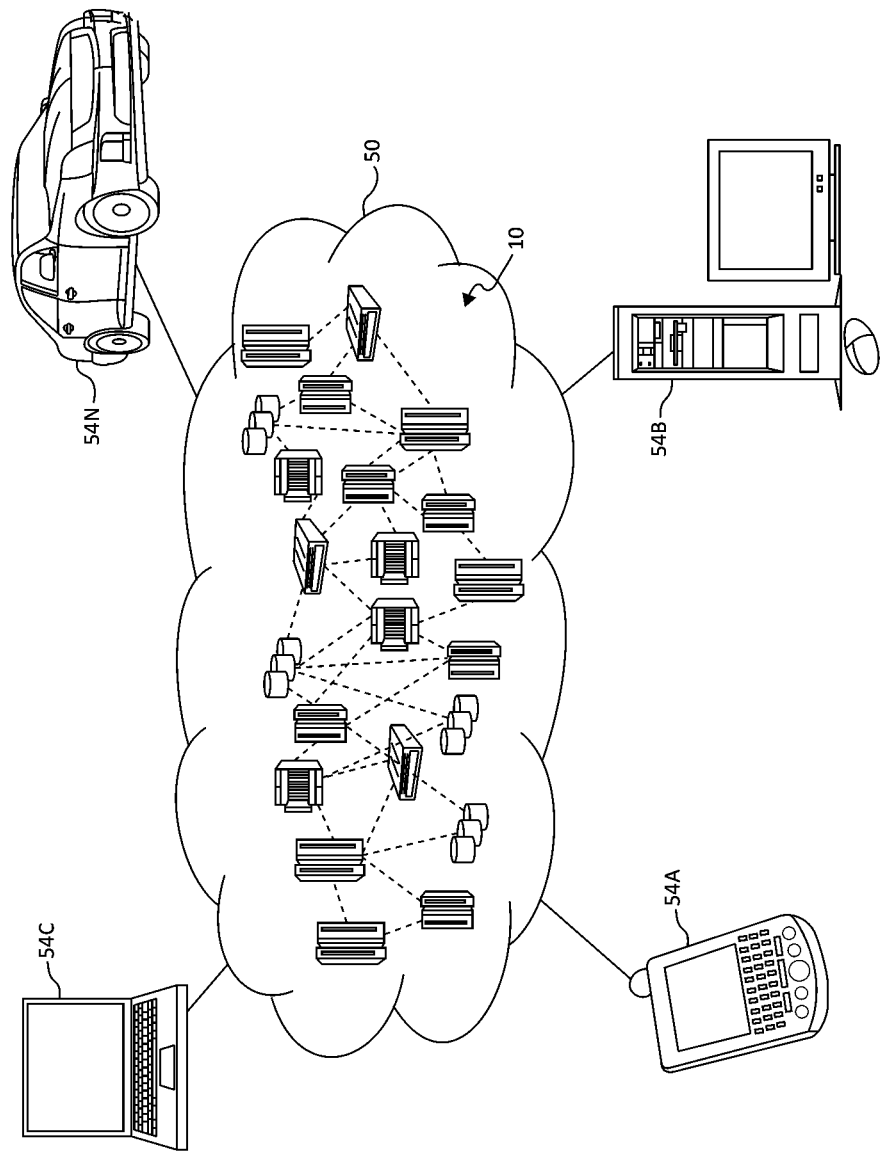
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
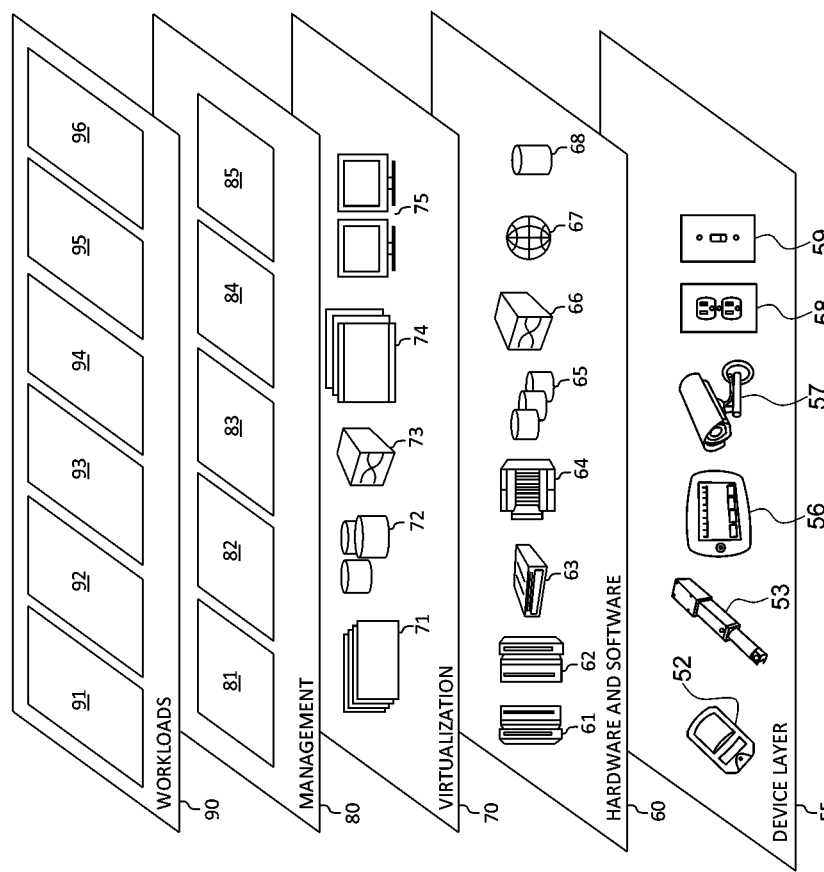
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated evaluation of robustness of machine learning models under adaptive whitebox adversarial operation in a computing environment (e.g., in a neural network architecture). In addition, workloads and functions 96 for automated evaluation of robustness of machine learning models under adaptive whitebox adversarial operation in a computing environment may include such operations as analytics, deep learning, and as will be further described, user and device management functions. One of ordinary skill in the art will appreciate that the workloads and functions 96 for automated evaluation of robustness of machine learning models under adaptive whitebox adversarial operation in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the present invention provides novel solutions for providing automated evaluation of robustness of machine learning models under adaptive whitebox adversarial operation in a computing environment in a computing system. A level of robustness of a machine learning model against adversarial whitebox operations may be evaluated and determined by applying a data set used for testing the machine learning model, one or more adversarial operation objectives, an adversarial threat model, and a selected number of hyperparameters. Results from the adversarial operation may be analyzed and a modified machine learning model may be generated in response to the evaluating and determining.

Figure 4:
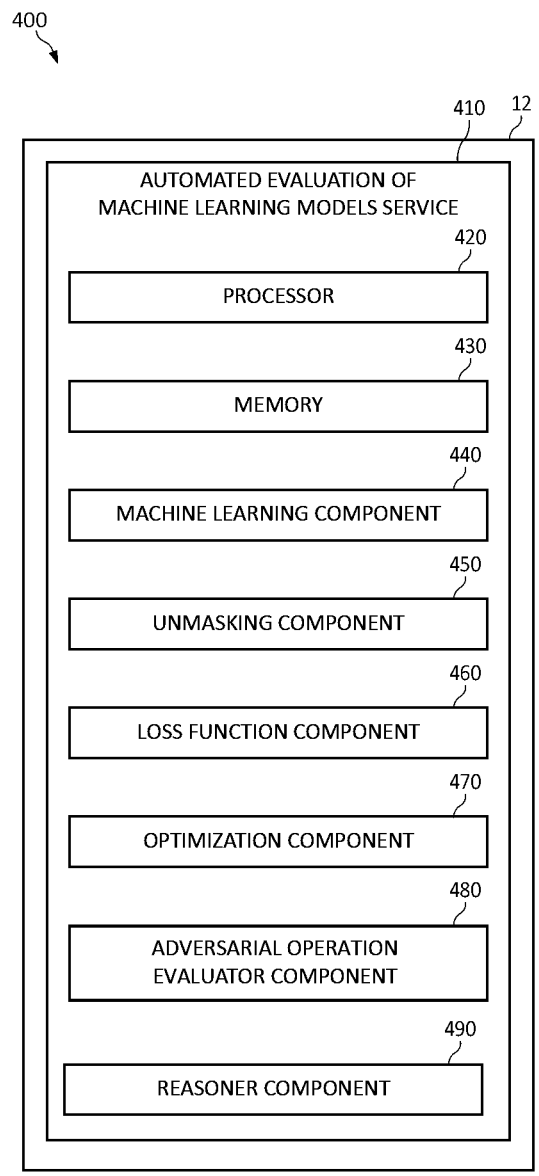
FIG. 4 is an additional block diagram depicting an exemplary functional relationship between various aspects of the present invention.

Turning now to FIG. 4, a block diagram depicting exemplary functional components of system 400 for automated evaluation of robustness of machine learning models under adaptive whitebox adversarial operation (e.g., automated evaluation of machine learning models) in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

A automated evaluation of machine learning models service 410 is shown, incorporating processing unit 420 ("processor") to perform various computational, data processing and other functionality in accordance with various aspects of the present invention. In one aspect, the processor 420 and memory 430 may be internal and/or external to the automated evaluation of machine learning models service 410, and internal and/or external to the computing system/server 12. The automated evaluation of machine learning models service 410 may be included and/or external to the computer system/server 12, as described in FIG. 1. The processing unit 420 may be in communication with the memory 430. The automated evaluation of machine learning models service 410 may include a machine learning component 440, an unmasking component 450, a loss function component 460, an optimization component, an adversarial operation evaluator 480, and a reasoner 490.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In one aspect, the machine learning component 440 may receive, identify, and/or select a machine learning model, a dataset for a data set used for testing the machine learning model, one or more adversarial operation objectives, an adversarial threat model, and a selected number of hyperparameters.

The machine learning component 440, in association with the adversarial operation evaluator 480, the reasoner component 490, and the optimization component 470, may automatically evaluate and determine a level of robustness of a machine learning model against adversarial whitebox operations. The machine learning component 440, in association with the adversarial operation evaluator 480 and reasoner component 490, may analyze results from the adversarial operation and generating a modified machine learning model while evaluating and determining.

The machine learning component 440, in association with the adversarial operation evaluator 480, the reasoner component 490, and the optimization component 470, may generate an evaluation summary based on evaluating and determining of the level of robustness of the machine learning model.

The machine learning component 440, in association with the adversarial operation evaluator 480, the reasoner component 490, and the optimization component 470, may automatically commence evaluating and determining the level of robustness of the machine learning model against the adversarial whitebox operations using partial inputs from a previous evaluation of the machine learning model.

The loss function component 460 may utilize final or intermediate machine learning model outputs with un-masked gradients to compose loss functions that are consistent with the adversarial operation objective.

In one aspect, the unmasking component 450 may localize gradient masking parts of a machine learning model and modifies the machine learning model by applying backward-pass differentiable approximations or reparameterizations.

In an additional aspect, the optimization component may adjust, modify, and/or tune one or more adversarial operation hyperparameters targeting the loss function towards optimal performance with respect to the adversarial operation objective. That is, the optimization component 470 may adjust the adversarial operation objectives, and/or the selected number of hyperparameters. In one aspect, the adversarial threat model is fixed and may not be modified). Also, the test data set, used for testing the machine learning model, is fixed. The test data set is only changed as different adversarial examples may be generated to assess model robustness under worst-case inputs from adaptive adversarial operations.

The optimization component 470, in association with the unmasking component 450, adversarial operation evaluator component 480 and the reasoner 490, may reconfigure or adjust an unmasking of gradients of the machine learning model, a loss function, an adversarial operation, and reanalyzing the results from the adversarial operations.

The adversarial operation evaluator 480 may apply end-to-end adversarial operations for diagnostic and final evaluation purposes where final evaluations may be performed within the specific threat model.

The reasoner component 490 may control an overall workflow of the system 400 such as, for example, any component associated with the automated evaluation of machine learning models service 410, based on diagnostic information obtained from each of the components of the automated evaluation of machine learning models service 410.

The optimization component 470, in association with the unmasking component 450, the adversarial operation evaluator component 480, the loss function component 460, and the reasoner 490, may reconfigure or adjust an unmasking of gradients of the machine learning model, a loss function, an adversarial operation, and reanalyzing the results from the adversarial operations, determine a robustness score for the machine learning model indicating a level of security from against adversarial whitebox operations, and/or rank the machine learning model based on the robustness score.

The machine learning component 440 may initialize a machine learning operation to learn and store the level of robustness of the machine learning model against the adversarial whitebox operations based on the machine learning model, a data set used for testing the machine learning model, one or more adversarial operation objectives, an adversarial threat model, and a selected number of hyperparameters and/or collect feedback in relation to automatically performing the diagnosis and evaluation of the level of robustness of a machine learning model according to at least a portion of the diagnosis and evaluation operation. That is, the modified machine learning model may be generated while in the process of evaluations (e.g. by changing a compute graph in order to unmask gradients). In one aspect, the machine learning model is not modified to increase the robustness, but rather, the machine learning model is modified to prevent gradient masking such as, for example, in order to prevent the robustness from being overestimated.

In one aspect, the machine learning component 440 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
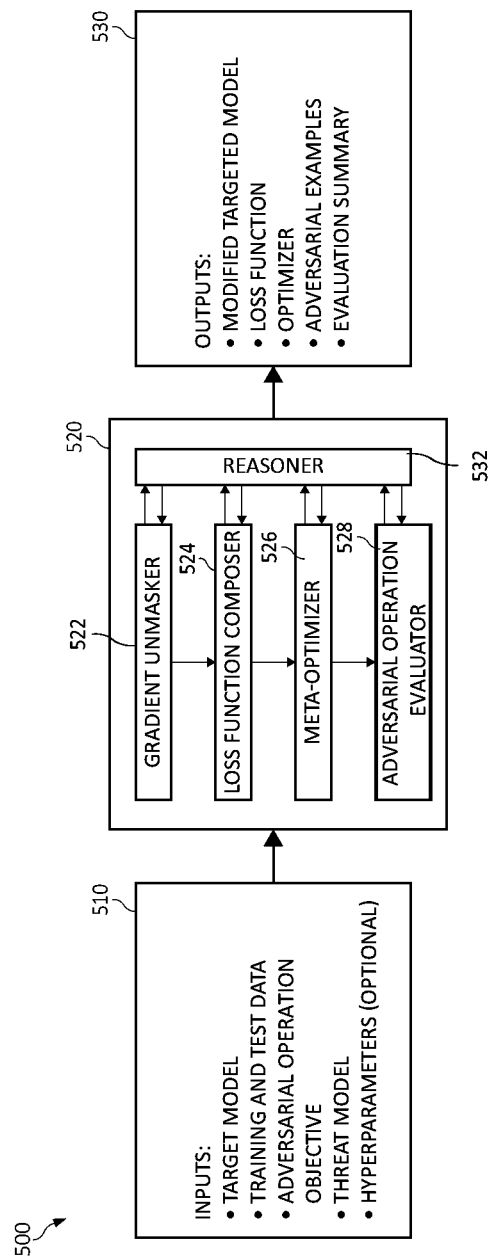
FIG. 5 is block flow diagram depicting an exemplary system and functionality for automated evaluation of robustness of machine learning models under adaptive whitebox adversarial operation in a computing environment by a processor in which aspects of the present invention may be realized.

Turning now to FIG. 5, a block diagram depicts exemplary an system 500 and functionality for automated evaluation of machine learning models in a computing environment. In one aspect, one or more of the components, modules, services, applications, and/or functions described in FIGS. 1-4 may be used in FIG. 5.

As shown, various blocks of functionality are depicted with arrows designating the blocks' of system 500 relationships with each other and to show process flow (e.g., steps or operations). Additionally, descriptive information is also seen relating each of the functional blocks' of system 500. As will be seen, many of the functional blocks may also be considered "modules" of functionality, in the same descriptive sense as has been previously described in FIGS. 1-4. With the foregoing in mind, the module blocks' of system 500 may also be incorporated into various hardware and software components of a system for automated evaluation of machine learning models in a computing environment in accordance with the present invention. Many of the functional blocks of system 500 may execute as background processes on various components, either in distributed computing components, or elsewhere.

As depicted, system 500 includes an automated evaluation of machine learning models system 520, which may include a gradient unmasker 522, a loss function composer 524, a meta-optimizer 526, an adversarial operation evaluator 528, and a reasoner 532.

As depicted in FIG. 5, starting in block 510 (input 510), the automated evaluation of machine learning models system 520 may receive various inputs such as, for example, a target model (e.g., a target machine learning model), training and test data, an adversarial operation objective, a threat model, and/or hyperparameters (and the hyperparameters may be optional).

In block 520 (e.g. in the automated evaluation of machine learning models system 520) the gradient unmasker 522 may localize gradient masking parts of the input model and modifies them (e.g. by applying backward-pass differentiable approximations or reparameterizations). The loss function composer 524 may utilize final or intermediate model outputs with un-masked gradients to compose loss functions that are consistent with the adversarial operation objective. The meta-optimizer 526 may adjust or "tune" adversarial operation hyperparameters targeting the loss function towards optimal performance with respect to the adversarial operation objective. The adversarial operation evaluator 528 may apply end-to-end adversarial operations for diagnostic and final evaluation purposes, where final evaluations are performed within the specific threat model. The reasoner 532 may control the overall workflow of the system based on diagnostic information obtained from each of the previous four components.

As depicted in block 530 (e.g., output), one or more outputs may be provided. The outputs may include, for example, a modified targeted model (e.g., a modified targeted machine learning model), a loss function, an optimizer, one or more adversarial examples, and an evaluation summary. In one aspect, by way of example only, the block 530 (output) may be a model graph with topology and backward functions modified to unmask gradients if applicable. The loss function may be consistent with the adversarial operation objective and convergent with a chosen optimizer. That is, as an output of the automated evaluation of machine learning models system 520, the loss function itself will be optimally designed to be consistent with the adversarial operation objective, i.e., higher loss values correlate with higher adversarial operation success rates. Moreover, the chosen optimizer (e.g., the meta-optimizer 526), which is used to maximize the loss function, is itself optimized to enable convergence of the loss function optimization. In one aspect, the optimizer (e.g., the meta-optimizer 526) may be designed with hyperparameters that are optimized in order to achieve high success rates in the adversarial operation evaluations. The adversarial samples may be generated throughout the adversarial operation evaluations. Also, the evaluation summary may provide and detail the iterations undertaken throughout the adversarial operation evaluations, the provenance of each adversarial sample, and any potential remaining issues (e.g. with masked gradient) that may result in higher adversarial operation success rates if resolved manually. Also, the evaluation summary may include a score and ranking as to a learned level of robustness of a machine learning model against adversarial whitebox operations.

Figure 6:
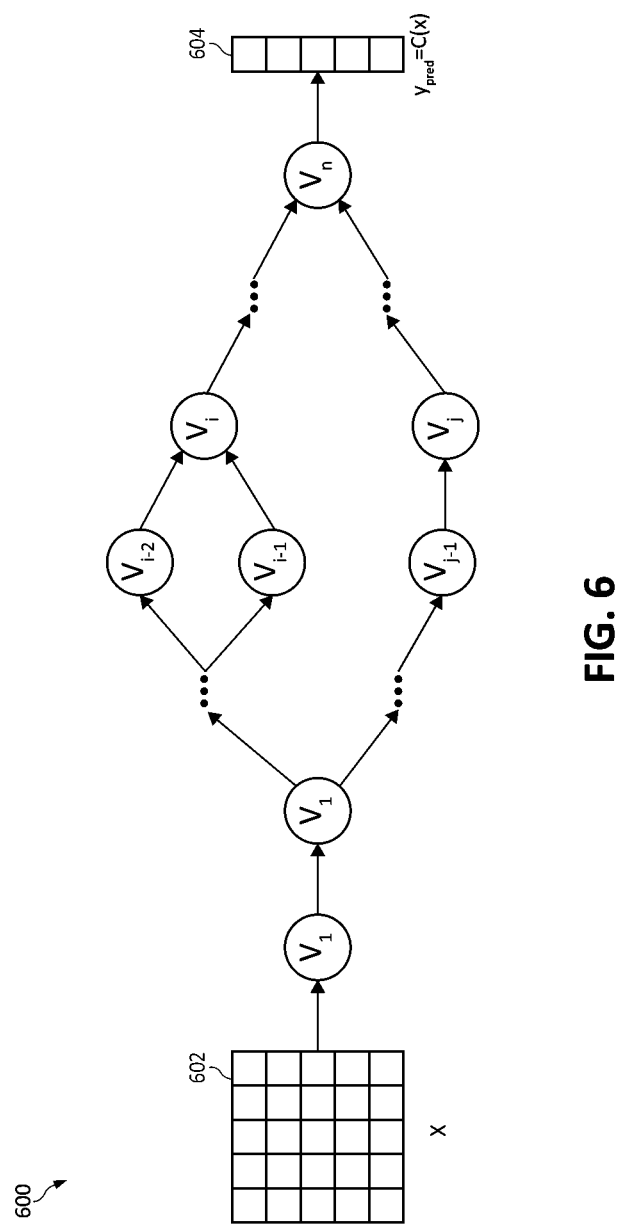
FIG. 6 is a graph diagram for automated evaluation of robustness of machine learning models under adaptive whitebox adversarial operation in a computing environment by a processor in which aspects of the present invention may be realized.

Turning now to FIG. 6, graph diagram depicts a machine learning model graph 600 representation of a machine learning model for automated evaluation of machine learning models in a computing environment. The system inputs into the machine learning model graph 600 (e.g., the graph representations of machine learning models) may include inputs 602 that include an adversarial operation objective and a threat model, and final evaluations 604. In one aspect, the machine learning model graph 600 may receive various inputs ("x") 602. The machine learning model graph 600 may include a classifier $C: \mathbb{R}^m \rightarrow \mathbb{R}^k$, represented as a directed acyclic graph G, where G=(V, E) with V={$v_1$, $v_2$, ..., $v_n$}, and $v_1$ is the global ancestor node, $v_n$ is the only leaf node and each node $v_i$ is associated with two functions, $f_i$ (=forward) and $b_i$ (=backward), where $f_i(b_i)$ takes as input the outputs of node $v_i$ parents' forward (backward) function. Node $v_1$ takes as input the classifier input x, $v_n$'s forward function outputs the classifier output C(x), $v_n$'s backward function outputs the partial derivatives of the classifier's output C(x) with respect to input ("x"). It should be noted that graph G representations of machine learning models may be readily available when implementing them in a neural network/deep learning environment.

The adversarial operation object may be an untargeted misclassification adversarial operation, i.e., for an input x (e.g., inputs 602) with ground truth label y and may generate an adversarial example input $x_{adv}$ such that $C(x_{adv}) \neq y$. The threat model may constrain adversarial examples such that the l-infinity norm $\|x - x_{adv}\|_p < \varepsilon$.

In operation, using the embodiments of FIGS. 5 and 6, the gradient unmasker 522 may be invoked by the reasoner 532 while masked gradients are being detected. The reasoner 532 may pass on any available information about the type of gradient masking (e.g., shattered, stochastic, vanishing, exploding etc.) and about a current adversarial operation loss function, which may rely only on parts of the machine learning model graph 600 of FIG. 6. The gradient unmasker 522 may localize (e.g. using brute-force or AI search) in relevant parts (e.g., any of the nodes) of the machine learning model graph 600 any components causing gradient masking. The gradient unmasker 522 attempts to unmask gradients where applicable, e.g. by removing components, or by applying backward-pass differentiable approximations or reparameterizations. The gradient unmasker 522 may return to the reasoner 532 log messages about the localization and diagnosis of masked gradients, the undertaken operations to unmask them, and any components for which the unmasking has been unsuccessful.

The loss function composer 524 may be invoked by the reasoner 532 while inconsistency or poor convergence of the loss function optimization is detected. The reasoner 524 may pass on any available information about the convergence of the current loss function and its correlation with the adversarial operation objective. The loss function composer 524 may attempt to improve the consistency and convergence of the loss function such as, for example, by exploring: 1) expected losses over random transformations or other stochastic components in the model; 2) losses based on intermediate/pen-ultimate outputs of the model (e.g., logit outputs compared to softmax-based outputs, feature adversaries etc.); 3) different families of loss functions (e.g., cross-entropy, hinge, mean-squared error, etc.); 4) novel types of synthesized loss functions, e.g., through evolutionary search; 5) different regularization terms (e.g., weight decay via L2 norm, sparsity induction via L1 norm) to improve convergence and adversarial operation performance; and/or 6) optimal hyperparameters for the loss function.

The meta optimizer 526 may be invoked by the reasoner 532 while convergence challenges or other types of optimization problems are discovered during adversarial operation evaluations. The meta optimizer 526 may attempt to improve the adversarial operation optimization and convergence such as, for example, by exploring: 1) usage of different search strategies (e.g., random search, gradient descent, evolutionary algorithms etc.); and/or 2) different optimizers (e.g., Adam, Stochastic Gradient Descent, L-BFGS etc.) and hyper-parameters.

The adversarial operation evaluator 528 may be invoked by the reasoner 532 in order to conduct diagnostic and final adversarial operation evaluations. Diagnostic adversarial operation evaluations may include a suite of gradient-based, gradient-free and transfer adversarial operations in order to diagnose whether the machine learning model (e.g., the machine learning model graph 600 of FIG. 6) 1) exhibits gradient masking, 2) the loss function is properly composed, and 3) the optimizer (e.g., the meta optimizer 526) may be chosen and configured. The meta optimizer 526 may be configured via a hyper-parameter optimization or evolutionary search over different optimization strategies.

The diagnostic adversarial operation evaluations may inform potential further invocations of the gradient unmasker, loss function composer and meta optimizer. That is, inspecting and reasoning over the outcomes of these diagnostic adversarial operation evaluations, the reasoner 532 may decide to further/additionally invoke the gradient unmasker 522, the loss function composer 524, and/or meta optimizer 526 in order to improve the overall performance of the adaptive adversarial operation.

The final adversarial operation evaluations may apply a final machine learning model (with unmasked gradients) (e.g., a modified machine learning model), a loss function, and an optimizer (e.g., output of block 530). Combined with any successful adversarial examples created during diagnostic adversarial operation evaluations, and the final adversarial operation evaluations inform the final evaluation results output by the system (e.g., the automated evaluation of machine learning models system 520). That is, the adversarial examples generated in the final evaluations may be combined on a per-example basis (e.g. through adversarial operation bundling) to report such as, for example, the percentage of test data points for which any of the performed adversarial operations (either a diagnostic or the final one) achieved the adversarial operation objective.

The reasoner 532 may be coordinating the adaptive adversarial operation evaluations. The reasoner 532 may include a variety of interactions with each component of the automated evaluation of machine learning models system 520 such as, for example, the following interactions. For example, the reasoner 532, in association with the adversarial operation evaluator 528, may perform diagnostic adversarial operation evaluations in order to detect gradient masking, sub-optimal loss functions and optimizer configurations (e.g., sub-optimal loss functions may be inconsistent loss functions, where maximum loss may not coincide with adversarial operation success and a sub-optimal optimizer configuration may be when the optimizer does not sufficiently execute all of the optimization steps); and perform final adversarial operation evaluations and compile a compilation of the results output (e.g., output of block 530) by the automated evaluation of machine learning models system 520. The results may be assigned a robustness score and be ranked in relation to all other previous final adversarial operation evaluations and scores.

The reasoner 532, in association with the meta optimizer 526, may improve optimizer configurations identified through diagnostic adversarial operation evaluations. The reasoner 532, in association with the loss function composer 524 may improve the composition of loss functions to overcome inconsistencies identified through diagnostic adversarial operation evaluations.

The reasoner 532, in association with the gradient unmasker 522, may further/additionally diagnose the gradient masking discovered through diagnostic adversarial operation evaluations and performance of gradient unmasking operations (if needed). The reasoner 532 may also include machine learning capabilities (e.g., advanced artificial intelligence "AI" reasoning capabilities, e.g. probabilistic reasoning) and be deployed for devising adaptive adversarial operations in more complex scenarios that may be learned, received, and/or defined by an administrator.

Figure 7:
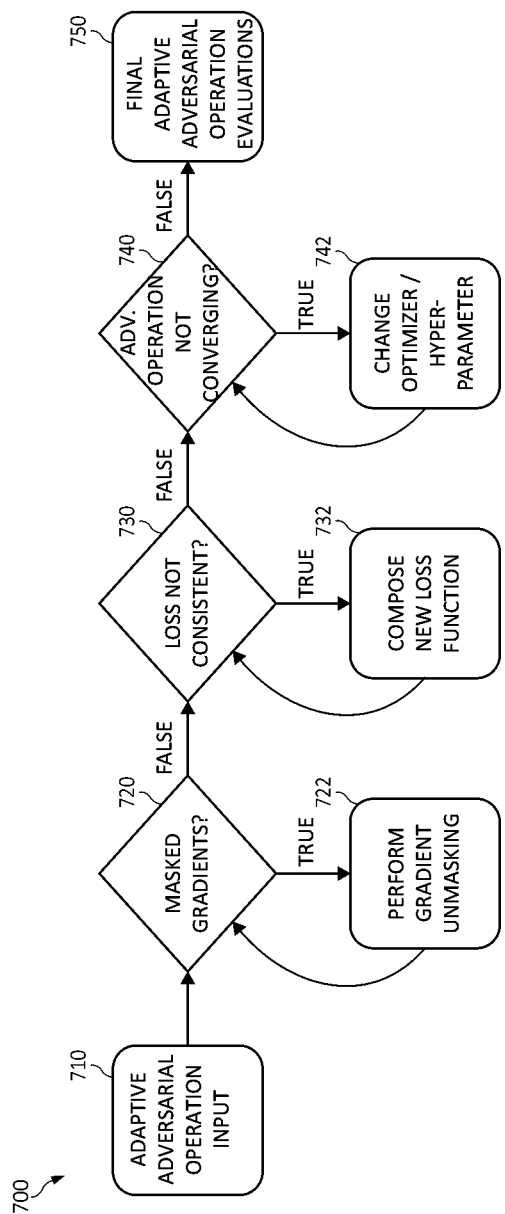
FIG. 7 is a flowchart diagram depicting an exemplary method for automated evaluation of robustness of machine learning models under adaptive whitebox adversarial operation in a computing environment by a processor in which aspects of the present invention may be realized.

Turning now to FIG. 7, a method 700 for automated evaluation of machine learning models in a computing environment using a processor is depicted, in which various aspects of the illustrated embodiments may be implemented. The functionality 700 may be implemented as a method (e.g., a computer-implemented method) executed as instructions on a machine, where the instructions are included on at least one computer readable medium or one non-transitory machine-readable storage medium. In one aspect, the reasoner 532 of FIG. 5 may be deployed for execution one or more operations of the functionality 700 of FIG. 7.

The functionality 700 may start in block 710 where one or more adaptive adversarial operation inputs may be received. In block 720, a determination operation may be executed to determine if one or more gradients are masked. If yes at block 720, a gradient masking operation may be performed, as in block 722. If no at block 720, a determination operation may be executed to determine if a loss function is not consistent, as in block 730. If yes at block 730, a new loss function may be determined and/or composed, as in block 732. If no at block 730, a determination operation may be executed to determine if the adaptive adversarial (ADV.) operation is not converging, as in block 740. If yes at block 740, an optimizer/hyperparameter may be changed, as in block 742. If no at block 740, a determination operation may be executed to determine final adaptive adversarial operation evaluations, as in block 750.

Figure 8:
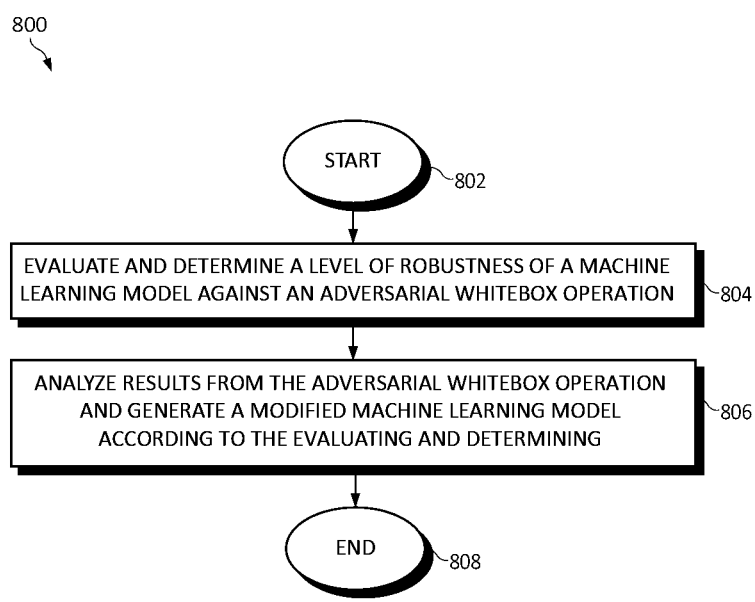
FIG. 8 is an additional flowchart diagram depicting an additional exemplary method for automated evaluation of robustness of machine learning models under adaptive whitebox adversarial operation in a computing environment by a processor in which aspects of the present invention may be realized.

Turning now to FIG. 8, a method 800 for automated evaluation of machine learning models in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

A level of robustness of a machine learning model against adversarial whitebox operations may be evaluated and determined, as in block 804. Results from the adversarial operation may be analyzed and a modified machine learning model may be generated according to evaluating and determining (e.g., during or while in the process of performing the evaluating and determining), as in block 806. The functionality 800 may end, as in block 808.

Figure 9:
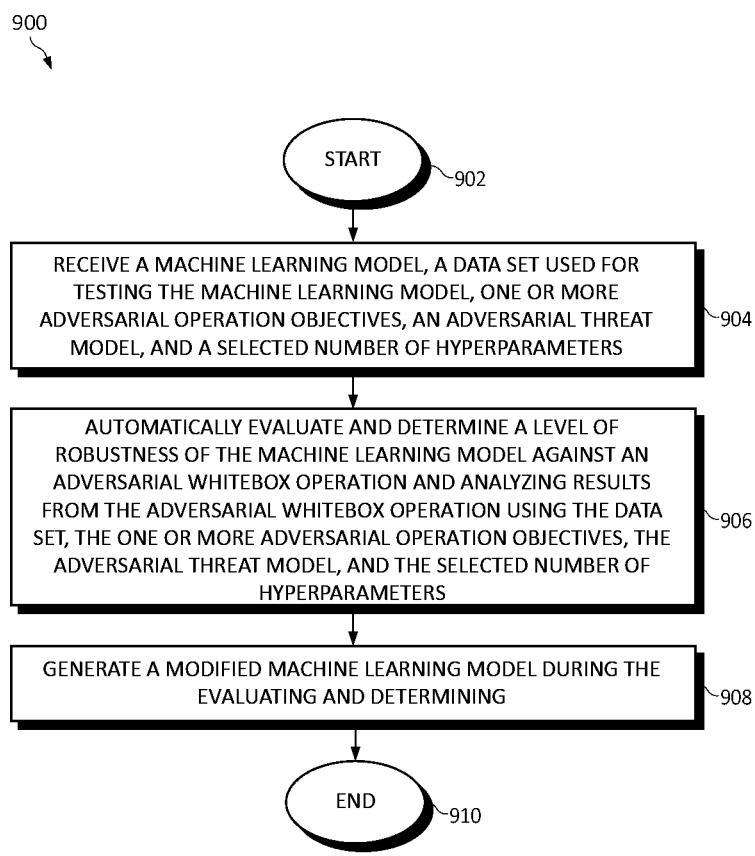
FIG. 9 is an additional flowchart diagram depicting an exemplary method for automated evaluation of robustness of machine learning models under adaptive whitebox adversarial operation in a computing environment by a processor in which aspects of the present invention may be realized.

Turning now to FIG. 9, an additional method 900 for automated evaluation of machine learning in a computing environment using a processor is depicted. The functionality 900 may be implemented as a method (e.g., a computer-implemented method) executed as instructions on a machine, where the instructions are included on at least one computer readable medium or one non-transitory machine-readable storage medium. The functionality 900 may start in block 902.

A machine learning model, a data set used for testing the machine learning model, one or more adversarial operation objectives, an adversarial threat model, and a selected number of hyperparameters may be received, as in block 904. A level of robustness of a machine learning model may be automatically evaluated and determined against an adversarial whitebox operation and analyzing results from the adversarial whitebox operation using the data set (used for testing the machine learning model), the one or more adversarial operation objectives, the adversarial threat model, and the selected number of hyperparameters, as in block 906. A modified machine learning model may be generated according to the evaluation and the determining (e.g., while performing the evaluating and determining, as in block 908. The functionality 900 may end, as in block 910.

Figure 10:
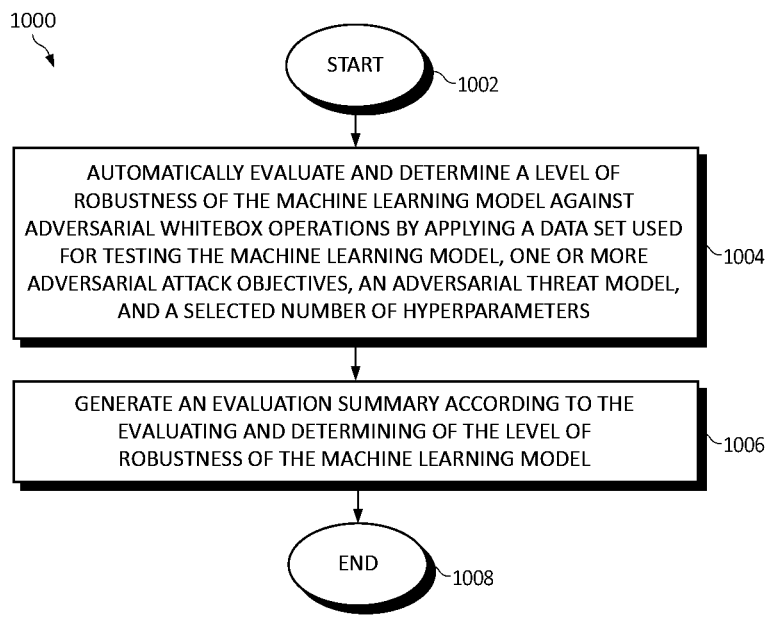
FIG. 10 is an additional flowchart diagram depicting an exemplary method for automated evaluation of robustness of machine learning models under adaptive whitebox adversarial operation in a computing environment in a computing environment by a processor in a computing environment by a processor, again, in which aspects of the present invention may be realized.

Turning now to FIG. 10, an additional method 1000 for automated evaluation of machine learning in a computing environment using a processor is depicted. The functionality 900 may be implemented as a method (e.g., a computer-implemented method) executed as instructions on a machine, where the instructions are included on at least one computer readable medium or one non-transitory machine-readable storage medium. The functionality 1000 may start in block 1002.

A level of robustness of a machine learning model against adversarial whitebox operations may be evaluated and determined by applying a data set used for testing the machine learning model, one or more adversarial operation objectives, an adversarial threat model, and a selected number of hyperparameters, as in block 1004. An evaluation summary may be generated according to the evaluating and determining of the level of robustness of the machine learning model, as in block 1006. The functionality 1000 may end, as in block 1008.

In one aspect, in conjunction with and/or as part of at least one blocks of FIGS. 8-10, the operations of 800, 900, and/or 1000 may include each of the following. The operations of 800, 900, and/or 1000 may receive the machine learning model, a data set used for testing the machine learning model, one or more adversarial operation objectives, an adversarial threat model, and a selected number of hyperparameters.

The operations of 800, 900, and/or 1000 may execute the one or more adversarial operation objectives, the adversarial threat model, and the selected number of hyperparameters on the machine learning model. The operations of 800, 900, and/or 1000 may apply one or more defenses in response to the executing the one or more adversarial operation objectives, the adversarial threat model, and the selected number of hyperparameters on the machine learning model The operations of 800, 900, and/or 1000 may generate an evaluation summary based on evaluating and determining of the level of robustness of the machine learning model.

The operations of 800, 900, and/or 1000 may automatically commence evaluating and determining the level of robustness of the machine learning model against the adversarial whitebox operations using partial inputs from a previous evaluation of the machine learning model.

The operations of 800, 900, and/or 1000 may adjust one or more adversarial operation objectives, an adversarial threat model, a selected number of hyperparameters, and a data set used for testing the machine learning model, and/or reconfigure or adjust an unmasking of gradients of the machine learning model, a loss function, an adversarial operation, and reanalyzing the results from the adversarial operations based on the machine learning model.

The operations of 800, 900, and/or 1000 may determine a robustness score for the machine learning model indicating a level of security from against adversarial whitebox operations and rank the machine learning model based on the robustness score.

The operations of 800, 900, and/or 1000 may initialize a machine learning operation to learn and store the level of robustness of the machine learning model against the adversarial whitebox operations based on the machine learning model, a data set used for testing the machine learning model, one or more adversarial operation objectives, an adversarial threat model, and a selected number of hyperparameters, and collect feedback in relation to automatically performing the diagnosis and evaluation of the level of robustness of a machine learning model against adversarial whitebox operations to generate the modified machine learning while performing at least a portion of the diagnosis and evaluation operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated evaluation of machine learning models in a computing environment by one or more processors comprising:

receiving a machine learning model, a data set used for testing the machine learning model, one or more adversarial operation objectives, an adversarial threat model, and a selected number of hyperparameters;

automatically evaluating and determining a level of robustness of the machine learning model against an adversarial whitebox operation and analyzing results from the adversarial whitebox operation using the data set, the one or more adversarial operation objectives, the adversarial threat model, and the selected number of hyperparameters, wherein the analyzing includes:

localizing a plurality of masked gradients within a graphical representation of the machine learning model, wherein the plurality of masked gradients is localized using brute-force or AI search on one or more nodes causing gradient masking;
unmasking one or more of the plurality of masked gradients by applying backward-pass differentiable approximations or reparameterizations;
diagnosing gradient information of one or more unmasked gradients and a current adversarial operation loss function;
identifying one or more parameter optimizations based on the diagnosing of the gradient information;
determining a first robustness score for the machine learning model by which the machine learning model is ranked, wherein the first robustness score indicates a level of security of the machine learning model against the adversarial whitebox operation;
generating an evaluation summary, wherein the evaluation summary includes the first robustness score, a provenance of each adversarial sample, and any issues that are recommended to be resolved manually;
generating a modified machine learning model by modifying an unmasking of gradients of the machine learning model by applying the backward-pass differentiable approximations or the reparameterizations by adjusting the one or more parameter optimizations previously identified;
determining a second robustness score for the modified machine learning model by evaluating the level of robustness of the modified machine learning model against the adversarial whitebox operations using partial inputs from a previous evaluation of the machine learning model;
ranking the modified machine learning model according to the level of robustness using the second robustness score, wherein a machine learning operation is initialized to learn and store the level of robustness of the machine learning model against the adversarial whitebox operations based on the machine learning model, the data set used for testing the machine learning model, the one or more adversarial objectives, the adversarial threat model, and a selected number of hyperparameters.

2. The method of claim 1, wherein the diagnosing the gradient information for the plurality of masked gradients includes identifying at least a type of gradient masking for each of the plurality of masked gradients within the graphical representation of the machine learning model, wherein the type of gradient masking includes at least one or more of, shattered gradients, stochastic gradients, or vanishing gradients.

3. The method of claim 1, further comprising:
generating one or more log messages, wherein the one or more log messages includes details with respect to the localization and the diagnosis of the plurality of masked gradients, operations performed to unmask the plurality of masked gradients, and a list of any components for which the unmasking is unsuccessful.

4. The method of claim 1, further comprising:
invoking a loss function composer in response to inconsistency or poor convergence in the current adversarial operation loss function, wherein the loss function composer utilizes output of the machine learning model and the one or more unmasked gradients to compose loss functions consistent with the one or more adversarial operation objectives.

5. The method of claim 4, further comprising:
executing the one or more adversarial operation objectives, the adversarial threat model, and the selected number of hyperparameters on the machine learning model;
applying one or more defenses in response to the executing the one or more adversarial operation objectives, the adversarial threat model, and the selected number of hyperparameters on the machine learning model;
adjusting the one or more adversarial operation objectives, the adversarial threat model, a selected number of hyperparameters, and the data set used for testing the machine learning model; and
modifying the unmasking gradients of the machine learning model, a loss function, and the one or more adversarial operation objections, wherein the loss function is modified based on the loss function composes in response to the inconsistency or the poor convergence in the current adversarial operation loss function.

6. The method of claim 1, further comprising:
invoking a meta optimizer in response to the diagnosing of the gradient information, wherein the meta optimizer utilizes different search strategies or different optimizers to tune the hyperparameters targeting a loss function towards optimal performance with respect to the one or more adversarial operation objectives.

7. The method of claim 1, wherein the modified machine learning model is generated while in a process of evaluations by changing a compute graph in order to further unmask gradients.

8. The method of claim 1, wherein the machine learning model is modified to prevent gradient masking such that the level of robustness is not overestimated.

9. The method of claim 1, wherein the initializing of the machine learning operation further comprises:
collecting feedback in relation to automatically evaluating and determining of the level of robustness of the machine learning model against the adversarial whitebox operations to generate the modified machine learning model while performing at least a portion of the evaluating and determining.

10. A system for automated evaluation of machine learning models in a computing environment, comprising:
one or more computers with executable instructions that when executed cause the system to:
receiving a machine learning model, a data set used for testing the machine learning model, one or more adversarial operation objectives, an adversarial threat model, and a selected number of hyperparameters;
automatically evaluating and determining a level of robustness of the machine learning model against an adversarial whitebox operation and analyzing results from the adversarial whitebox operation using the data set, the one or more adversarial operation objectives, the adversarial threat model, and the selected number of hyperparameters, wherein the analyzing includes:
localizing a plurality of masked gradients within a graphical representation of the machine learning model, wherein the plurality of masked gradients is localized using brute-force or AI search on one or more nodes causing gradient masking;
unmasking one or more of the plurality of masked gradients by applying backward-pass differentiable approximations or reparameterizations;
diagnosing gradient information of one or more unmasked gradients and a current adversarial operation loss function;

identifying one or more parameter optimizations based on the diagnosing of the gradient information;

determining a first robustness score for the machine learning model by which the machine learning model is ranked, wherein the first robustness score indicates a level of security of the machine learning model against the adversarial whitebox operation;

generating an evaluation summary, wherein the evaluation summary includes the first robustness score, a provenance of each adversarial sample, and any issues that are recommended to be resolved manually;

generating a modified machine learning model by modifying an unmasking of gradients of the machine learning model by applying the backward-pass differentiable approximations or the reparameterizations by adjusting the one or more parameter optimizations previously identified;

determining a second robustness score for the modified machine learning model by evaluating the level of robustness of the modified machine learning model against the adversarial whitebox operations using partial inputs from a previous evaluation of the machine learning model;

ranking the modified machine learning model according to the level of robustness using the second robustness score, wherein a machine learning operation is initialized to learn and store the level of robustness of the machine learning model against the adversarial whitebox operations based on the machine learning model, the data set used for testing the machine learning model, the one or more adversarial objectives, the adversarial threat model, and a selected number of hyperparameters.

11. The system of claim 10, wherein the executable instructions when executed cause the system to diagnose the gradient information for the plurality of masked gradients includes identifying at least a type of gradient masking for each of the plurality of masked gradients within the graphical representation of the machine learning model, wherein the type of gradient masking includes at least one or more of, shattered gradients, stochastic gradients, or vanishing gradients.

12. The system of claim 10, wherein the executable instructions when executed cause the system to:

generate one or more log messages, wherein the one or more log messages includes details with respect to the localization and the diagnosis of the plurality of masked gradients, operations performed to unmask the plurality of masked gradients, and a list of any components for which the unmasking is unsuccessful.

13. The system of claim 10, wherein the executable instructions when executed cause the system to:

invoke a loss function composer in response to inconsistency or poor convergence in the current adversarial operation loss function, wherein the loss function composer utilizes output of the machine learning model and the one or more unmasked gradients to compose loss functions consistent with the one or more adversarial operation objectives.

14. The system of claim 13, wherein the executable instructions when executed cause the system to:

execute the one or more adversarial operation objectives, the adversarial threat model, and the selected number of hyperparameters on the machine learning model;

apply one or more defenses in response to the executing the one or more adversarial operation objectives, the adversarial threat model, and the selected number of hyperparameters on the machine learning model;

adjust the one or more adversarial operation objectives, the adversarial threat model, a selected number of hyperparameters, and the data set used for testing the machine learning model; and modify the unmasking gradients of the machine learning model, a loss function, and the one or more adversarial operation objections, wherein the loss function is modified based on the loss function composes in response to the inconsistency or the poor convergence in the current adversarial operation loss function.

15. The system of claim 10, wherein the executable instructions when executed cause the system to:

invoke a meta optimizer in response to the diagnosing of the gradient information, wherein the meta optimizer utilizes different search strategies or different optimizers to tune the hyperparameters targeting a loss function towards optimal performance with respect to the one or more adversarial operation objectives.

16. A computer program product for automated evaluation of machine learning models in a computing environment, the computer program product comprising:

one or more computer readable storage media, and program instructions collectively stored on the one or more computer readable storage media, the program instruction comprising:

program instructions to receive a machine learning model, a data set used for testing the machine learning model, one or more adversarial operation objectives, an adversarial threat model, and a selected number of hyperparameters;

program instructions to automatically evaluating and determining a level of robustness of the machine learning model against an adversarial whitebox operation and analyzing results from the adversarial whitebox operation using the data set, the one or more adversarial operation objectives, the adversarial threat model, and the selected number of hyperparameters, wherein the analyzing includes:

localizing a plurality of masked gradients within a graphical representation of the machine learning model, wherein the plurality of masked gradients is localized using brute-force or AI search on one or more nodes causing gradient masking;

unmasking one or more of the plurality of masked gradients by applying backward-pass differentiable approximations or reparameterizations;

diagnosing gradient information of one or more unmasked gradients and a current adversarial operation loss function;

identifying one or more parameter optimizations based on the diagnosing of the gradient information;

determining a first robustness score for the machine learning model by which the machine learning model is ranked, wherein the first robustness score indicates a level of security of the machine learning model against the adversarial whitebox operation;

generating an evaluation summary, wherein the evaluation summary includes the first robustness score, a provenance of each adversarial sample, and any issues that are recommended to be resolved manually;

generating a modified machine learning model by modifying an unmasking of gradients of the machine learning model by applying the backward-pass differentiable approximations or the reparameterizations by adjusting the one or more parameter optimizations previously identified;
determining a second robustness score for the modified machine learning model by evaluating the level of robustness of the modified machine learning model against the adversarial whitebox operations using partial inputs from a previous evaluation of the machine learning model;
ranking the modified machine learning model according to the level of robustness using the second robustness score, wherein a machine learning operation is initialized to learn and store the level of robustness of the machine learning model against the adversarial whitebox operations based on the machine learning model, the data set used for testing the machine learning model, the one or more adversarial objectives, the adversarial threat model, and a selected number of hyperparameters.

17. The computer program product of claim 16, further including program instructions to diagnose the gradient information for the plurality of masked gradients includes identifying at least a type of gradient masking for each of the plurality of masked gradients within the graphical representation of the machine learning model, wherein the type of gradient masking includes at least one or more of, shattered gradients, stochastic gradients, or vanishing gradients.

18. The computer program product of claim 16, further including program instructions to:
generate one or more log messages, wherein the one or more log messages includes details with respect to the localization and the diagnosis of the plurality of masked gradients, operations performed to unmask the plurality of masked gradients, and a list of any components for which the unmasking is unsuccessful.

19. The computer program product of claim 16, further including program instructions to:
invoke a loss function composer in response to inconsistency or poor convergence in the current adversarial operation loss function, wherein the loss function composer utilizes output of the machine learning model and the one or more unmasked gradients to compose loss functions consistent with the one or more adversarial operation objectives.

20. The computer program product of claim 19, further including program instructions to:
execute the one or more adversarial operation objectives, the adversarial threat model, and the selected number of hyperparameters on the machine learning model;
apply one or more defenses in response to the executing the one or more adversarial operation objectives, the adversarial threat model, and the selected number of hyperparameters on the machine learning model;
adjust the one or more adversarial operation objectives, the adversarial threat model, a selected number of hyperparameters, and the data set used for testing the machine learning model; and
modify the unmasking gradients of the machine learning model, a loss function, and the one or more adversarial operation objections, wherein the loss function is modified based on the loss function composes in response to the inconsistency or the poor convergence in the current adversarial operation loss function.

21. The computer program product of claim 16, further including program instructions to:
invoke a meta optimizer in response to the diagnosing of the gradient information, wherein the meta optimizer utilizes different search strategies or different optimizers to tune the hyperparameters targeting a loss function towards optimal performance with respect to the one or more adversarial operation objectives.

22. A method for automated evaluation of machine learning models in a computing environment by one or more processors comprising:
receiving a machine learning model, a data set used for testing the machine learning model, one or more adversarial operation objectives, an adversarial threat model, and a selected number of hyperparameters;
automatically evaluating and determining a level of robustness of the machine learning model against an adversarial whitebox operation and analyzing results from the adversarial whitebox operation using the data set, the one or more adversarial operation objectives, the adversarial threat model, and the selected number of hyperparameters, wherein the analyzing includes:
localizing a plurality of masked gradients within a graphical representation of the machine learning model;
unmasking one or more of the plurality of masked gradients by applying backward-pass differentiable approximations or reparameterizations;
diagnosing gradient information of one or more unmasked gradients and a current adversarial operation loss function;
identifying one or more parameter optimizations based on the diagnosing of the gradient information;
determining a first robustness score for the machine learning model by which the machine learning model is ranked, wherein the first robustness score indicates a level of security of the machine learning model against the adversarial whitebox operation; and
generating a modified machine learning model by modifying an unmasking of gradients of the machine learning model by applying the backward-pass differentiable approximations or the reparameterizations by adjusting the one or more parameter optimizations previously identified.

23. The method of claim 22, further comprising:
generating an evaluation summary, wherein the evaluation summary includes the first robustness score, a provenance of each adversarial sample, and any issues that are recommended to be resolved manually.

24. The method of claim 22, further comprising:
determining a second robustness score for the modified machine learning model by evaluating the level of robustness of the modified machine learning model against the adversarial whitebox operations using partial inputs from a previous evaluation of the machine learning model; and
ranking the modified machine learning model according to the level of robustness using the second robustness score, wherein a machine learning operation is initialized to learn and store the level of robustness of the machine learning model against the adversarial whitebox operations based on the machine learning model, the data set used for testing the machine learning model, the one or more adversarial objectives, the adversarial threat model, and a selected number of hyperparameters.

25. A system for automated evaluation of machine learning models in a computing environment, comprising:
one or more computers with executable instructions that when executed cause the system to:
receiving a machine learning model, a data set used for testing the machine learning model, one or more adversarial operation objectives, an adversarial threat model, and a selected number of hyperparameters;

automatically evaluating and determining a level of robustness of the machine learning model against an adversarial whitebox operation and analyzing results from the adversarial whitebox operation using the data set, the one or more adversarial operation objectives, the adversarial threat model, and the selected number of hyperparameters, wherein the analyzing includes:

localizing a plurality of masked gradients within a graphical representation of the machine learning model;

unmasking one or more of the plurality of masked gradients by applying backward-pass differentiable approximations or reparameterizations;

diagnosing gradient information of one or more unmasked gradients and a current adversarial operation loss function;

identifying one or more parameter optimizations based on the diagnosing of the gradient information;

determining a first robustness score for the machine learning model by which the machine learning model is ranked, wherein the first robustness score indicates a level of security of the machine learning model against the adversarial whitebox operation; and generating a modified machine learning model by modifying an unmasking of gradients of the machine learning model by applying the backward-pass differentiable approximations or the reparameterizations by adjusting the one or more parameter optimizations previously identified.

\* \* \* \* \*